PHOTOGRAPHIC FACSIMILE RECORDER USING A CRATER LAMP

Filed Aug. 8, 1946

INVENTOR
LOUIS A. THOMPSON.
BY J. D. Douglass
HIS ATTORNEY

Patented Dec. 26, 1950

2,535,610

UNITED STATES PATENT OFFICE 2,535,610

PHOTOGRAPHIC FACSIMILE RECORDER USING A CRATER LAMP

Louis A. Thompson, Rocky River, Ohio, assignor to NEA Service, Inc., Cleveland, Ohio, a corporation of Delaware Application August 8, 1946, Serial No. 689,114

2 Claims. (Cl. 178—6.7)

This invention relates to improvements in apparatus for the transmission of pictures by wire or radio, and more particularly to improvements in method and apparatus for the reception of facsimile pictures.

Heretofore, it has been proposed to record pictures by providing a light source, the output of which is controlled by a valve or mirror-galvanometer which, in conjunction with a suitable lens system, was used to expose the picture, the operation thereof being controlled by the picture signal. The picture is usually reproduced by exposing a sheet of light sensitive material that is secured on a rotating drum, with the light from an optical unit. The optical unit, which exposes the sheet, moves longitudinally of the drum to place on or remove the picture from the drum in a helical path.

These prior exposure devices, although satisfactory, had certain inherent disadvantages which the present invention overcomes. In general, the operation of the apparatus was dependent upon the proper correlation of certain electrical circuits and mechanical parts. The mechanical parts were necessarily somewhat complicated and usually of an extremely delicate nature. Furthermore, it was somewhat difficult to provide an apparatus whereby the received picture could be controlled to form either a positive or a negative picture. Usually, in order to effect such results, it was necessary to shift some of the mechanical parts and the very fact that these parts were of shiftable nature added to the complexity of the device as well as making it difficult to maintain a proper adjustment thereof. Furthermore, in the systems used prior to my invention, it was common practice to receive the modulated carrier, which include the upper and lower side bands, and remove the modulation component which was then used to control the exposure of the picture. The removal of the modulation component was effected by rectifying and filtering. Commonly, a low pass filter was used which rejected the carrier as well as the upper side band and the modulation component in the lower side band was used. The prior devices, then, not only rejected the detail in one half of the signal, because they only utilized the lower side band, but lost the greater detail which was in the upper side band.

I have discovered that the upper side band, which includes the frequency greater than the carrier frequency, contains certain picture elements or parts thereof which are not present in the lower side band, which consist in the frequencies less than the carrier frequency.

By the method and apparatus of my invention, I utilize not only the lower side band but the upper side band as well. This I effect by rectifying the signal without demodulating the same. By rectifying the signal with a full wave rectifier I take the negative alternations and place them with the positive alternations to provide a signal which contains all of the modulation components of the complete signal. There is no limiting band filter inserted. This enables me to utilize the full detail found in the upper side band as well as that of the lower side band, providing greater detail in the picture. Further, the 1920 cycle modulated carrier is now converted to a 3840 cycle pulsating direct current signal which provides a more desirable dot formation in the completed picture, materially increasing the fidelity.

Another advantage in my present invention resides in the elimination of mechanical moving parts in the exposure unit including the mirror galvanometer, since I have provided a system wherein all moving parts, other than the complete optical unit as a unit itself are eliminated.

Generally, these exposure results are effected by the use of a gaseous discharge crater lamp, this being a gas filled tube which, when voltage is applied, causes ionization of the gas therein and a resultant illumination, the intensity of which is a function of the power applied. I appreciate that crater lamps have been used heretofore. The circuit of my invention, I believe, however, to be novel in connection with the use of crater lamps for exposing pictures. Among the other advantages of the system, besides the eliminating of all moving parts, is the ability to make the resultant picture either a negative or a positive, as desired, by comparatively simple control.

Still other advantages of the invention, and the invention itself, will become more apparent from the following description of an embodiment of my invention, which description is illustrated by the accompanying drawings and forms a part of this specification.

Figure 1:
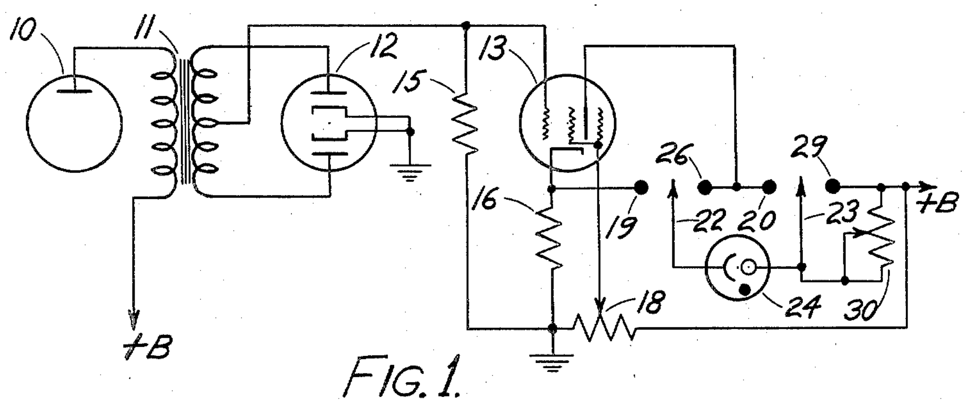
Fig. 1 is a schematic diagram of a circuit embodying my invention.

Broadly, my invention comprises utilizing a picture signal to energize a crater lamp to cause the light intensity to vary in accordance with the signal amplitude.

As is well known to those versed in the art, it is common practice to scan a picture, which usually is a positive, to provide a picture signal that may comprise a carrier which is amplitude modulated in accordance with the light and dark elemental areas of the picture. In case the signal is transmitted over land lines, the carrier frequency may be 1920 c. p. s. In the case of radio transmission, the radio frequency carrier may be modulated. It will also be appreciated that, in certain aspects, my invention is also useful with the carriers that may be frequency modulated by the signal if desired, but for the purpose of explanation, an amplitude modulated signal only will be considered.

This signal is taken in at the receiver and rectified in a full wave rectifier and used to control the operation of a crater lamp which may be of the character manufactured by Westinghouse known as a type CR1 or CR2, or Sylvania type 1130 or 1131.

More specifically, the signal, after being received, may be amplified the desired amount and may appear as a 1920 cycle amplitude modulated signal in the output of the amplifier indicated by the anode 10. It is then transferred by the transformer 11 to the double diode rectifier which is connected to provide full wave rectification. The signal, which is now a pulsating direct current signal of 3840 cycles, and containing all of the amplitude component of intelligence which it originally carried, appears on the first grid of the tube 13. This tube may be a pentode tube of the power amplifier type, such as a 6F6 and is provided with the usual grid and cathode resistance 16 and 15. The screen grid is provided with potential which may be adjusted through the potentiometer 18.

In the output circuit of the tube 13, the cathode is connected to the terminals 19 and the anode lead to the two terminals 20—26 of a double pole, double-throw switch, the movable leads 22—23 of which have a crater lamp 24 connected therebetween. The final terminal 29 of the switch is connected to the voltage source and the swinger lead 23 is connected to the voltage source through a potentiometer 30.

The apparatus is adapted to expose a light sensitive material to provide either a positive or negative as may be desired by merely moving swinger leads 22—23, which are ganged together, to either the terminal 19—20 or 26—29.

Figure 2:
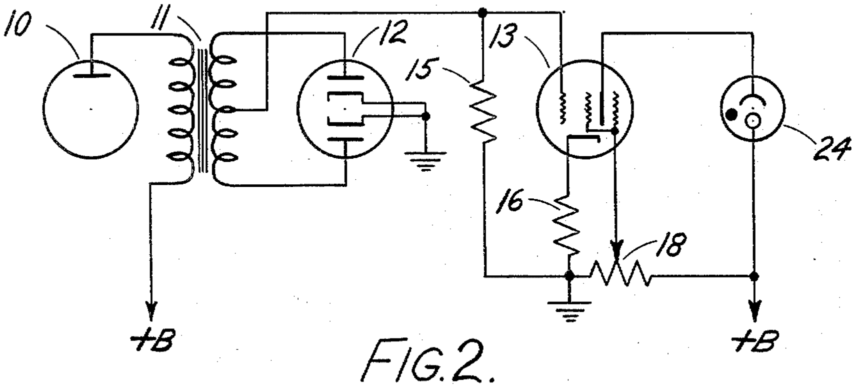
Fig. 2 is a simplified view showing the circuit adjusted for making positives.

Fig. 2 is a simplified diagram showing the parts of the circuit of Fig. 1, when the leads 22—23 are connected to the terminals 26—29, which are utilized when it is desired to receive a positive picture.

The tube 13 is connected, at this time, so that it draws maximum current which may be as much as 30 ma., this current being through the crater lamp 24 causes the lamp to glow with maximum desired brilliance. At this time, the light will expose the film to cause maximum black.

A signal coming in through the amplifier 10 is rectified in the rectifier 12 which, being a full wave rectifier, converts the signal to a pulsating direct current signal that appears on the grid as a varying negative potential. The higher the signal, the greater the negative potential on the grid of tube 13, and as the negative potential increases, the plate current decreases, and with the decrease in plate current, the light output from the crater lamp decreases. If the signal should go high enough to stop plate current flow, there would be no light output from the crater lamp, and the film would be unexposed at this time.

It will be understood that the transmitted signal, which may be from a positive picture, provides maximum signal when "picture white" is being sent, and minimum signal when "picture black" is being sent. Therefore, "picture white" or maximum signal biases the tube 13 so that the crater lamp ceases to glow, or is of a very low value, preventing exposure of the film and which results in "picture white" on the receiving material after development in the usual manner. Likewise, when the incoming signal is "picture black" or minimum signal, the bias is off of the grid of the tube, and the tube is drawing maximum current, causing the lamp 24 to grow brighter, causing the sensitive film to be exposed and resulting in "picture black" in the final picture. The picture being created is, therefore, the same as the picture being sent, and a positive picture may therefore be obtained from the positive being transmitted, it being a series of dots of twice the frequency of the transmitted signal.

Figure 3:
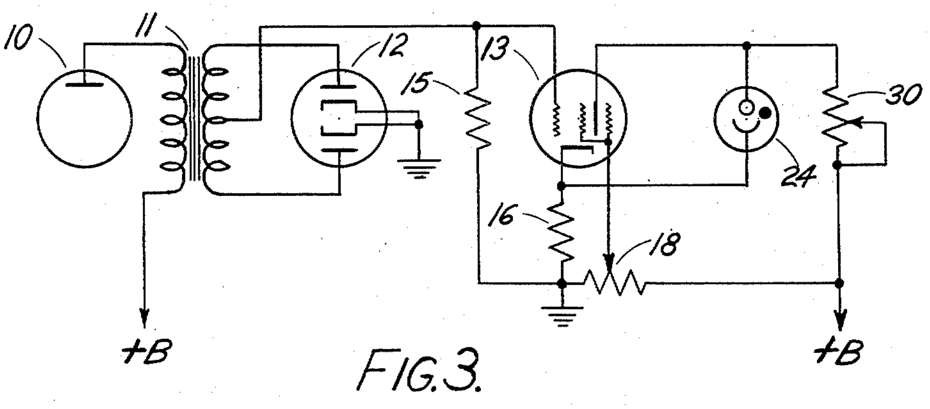
Fig. 3 is a view illustrating the circuit and adjusted for making negatives.

Fig. 3 illustrates the condition when the picture being received is desired to be a negative. In this instance, the movable switch arms 22—23 are in the left hand position making contact with the terminals 19—20. The potentiometer 30 is in the circuit and the anode supply for the tube 13 is through it. The crater lamp is connected directly between the plate and the cathode or in shunt across the output of the tube 13.

The operation of the system up to the point where the rectified signal controls the plate current is the same. However, since the vacuum tube is a negative resistance device, when the grid is without negative voltage due to the lack of a rectified signal, the current flow from the B supply is through the tube, and but very little current flows through the crater lamp. When a negative signal voltage appears on the grid, the resistance of the tube rises in proportion to the signal and more of the curent flows through the crater lamp. Thus the crater lamp glows brightest when the signal on the tube is of highest amplitude, and 'picture white" causes the light sensitive material to get the greatest exposure at this time. Conversely, when there is no signal, or "picture black," the tube resistance is low, and the current is through the tube rather than the crater lamp, causing the illumination to drop off and resulting in non-exposure of the film or light sensitive material.

The crater lamp is arranged in conjunction with a lens system in such a manner that the varying light from the lamp is concentrated in a very small discrete spot on the light sensitive material.

It will thus be seen that I have provided an improved method and circuit for causing the exposure of a facsimile picture, and one wherein the exposure of either a negative or a positive may be effected at the will of the operator without the manipulation or adjustment of any mechanical parts. Inasmuch as there are no light valves, oscillograph-galvanometers, or other equivalent mechanism in my apparatus, it is easy to adjust, simple to operate, and does not readily get out of adjustment in the course of time.

The system utilizes the full signal wave taking advantage of the higher fidelity components in the upper side band, as well as the lower side band to provide an exposure, the dot formation of which is twice the frequency of the incoming signal.

Having thus described my invention, I claim:

1. An exposure device for exposing pictures to selectively produce positives or negatives of the transmitted picture from a transmitted facsimile signal comprising a receiver for receiving the signal, a full wave rectifier connected to the receiver for rectifying the signal and converting it to a pulsating negative direct current the amplitude of which varies in accordance with the modulation component of the signal, a direct current amplifier including a vacuum tube having a control grid directly connected to the rectifier output, said amplifier having an output, power supply means for supplying voltage to the amplifier, exposure means for connection in the output circuit of said amplifier tube in series with the power supply for making positives or in shunt with the tube for making negatives including a crater lamp, switch means for connecting said crater lamp into the circuit including a switch having swingable terminals connected to the crater lamp, the anode of said tube having a pair of switch contacts for alternate connection to each of said swingable terminals, one of said swingable terminals being arranged to be connected to the cathode of the tube or the anode and the other of said terminals arranged to be connected to the anode of the tube or to the source of power supply respectively.

2. An exposure device for exposing pictures to selectively produce positives or negatives of the transmitted picture from a transmitted facsimile signal comprising a receiver for receiving a signal, a rectifier for rectifying the signal, an amplifier including a vacuum tube having a control grid connected to the rectifier output, said amplifier having an output including an anode and a cathode, power supply means for supplying voltage to the amplifier, exposure means for connection in the output circuit of said amplifier tube in series with the power supply for making positive or in shunt with the tube for making negatives including a crater lamp, switch means for connecting said crater lamp into the circuit including a switch having swingable terminals connected to the crater lamp, the anode of said tube having a pair of switch contacts for alternate connection to each of said swingable terminals, one of said swingable terminals being arranged to be connected to the cathode of the tube or the anode and the other of said terminals arranged to be connected to the anode of the tube or to the source of power supply respectively.

LOUIS A. THOMPSON.

REFERENCES CITED

The following references are of record in the file of this patent:

UNITED STATES PATENTS

| Number | Name | Date |
|---|---|---|
| 2,105,769 | Hansen | Jan. 18, 1938 |
| 2,136,340 | Hardy | Nov. 8, 1938 |
| 2,193,665 | Balsey | Mar. 12, 1940 |
| 2,250,730 | Stewart | July 29, 1941 |
| 2,262,156 | Barnes et al. | Nov. 11, 1941 |
| 2,274,841 | Mathes | Mar. 3, 1942 |
| 2,315,362 | Wise | Mar. 30, 1943 |
| 2,453,905 | Grib | Nov. 16, 1948 |

OTHER REFERENCES

Television News, vol. I, January-February 1932, pp. 432, 433.